Patented Feb. 11, 1936

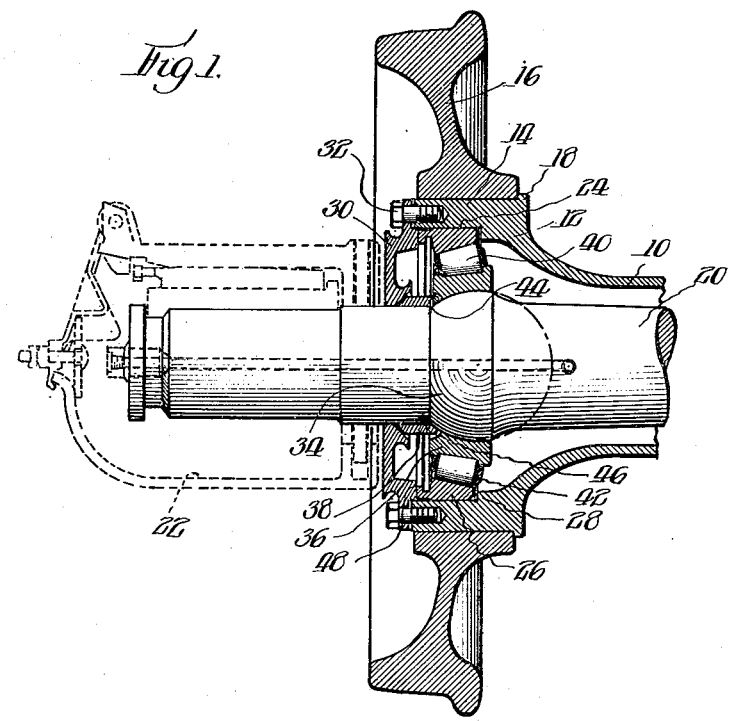

2,030,151

UNITED STATES PATENT OFFICE 2,030,151

ANTIFRICTION WHEEL AND AXLE ASSEMBLY

Alfred H. Oelkers, Chicago, Ill., assignor to American Steel Foundries, Chicago, Ill., a corporation of New Jersey Application January 28, 1929, Serial No. 335,648

21 Claims. (Cl. 295—36)

This invention pertains to improvements in anti-friction wheel and axle assemblies, and more particularly to mountings for the tapered roller type of anti-friction bearings in railroad axles whereby self-alignment of the anti-friction bearings is permitted.

Where Timken or tapered roller type of bearings are used in railroad axle assemblies, it is usual to provide an inner and outer race ring having rigid cooperation with inner and outer axles, such as particularly described in application Serial No. 182,734, filed April 11, 1927, by Alfred H. Oelkers, for Anti-friction wheel and axle construction, Patent No. 1,902,910, March 28, 1933. In the use of such construction it has been found that where a heavy load is applied to the extended ends of the inner normally stationary axle, a certain amount of bending or deflection of the inner axle takes place independently of the housing or outer axle in which the outer race is mounted, and this condition prevents a uniform loading of the rollers throughout their length, that is, where under a condition of no load there is a perfect line contact between the rollers and the race rings, under a condition of maximum load, it is found that the rollers and race rings contact only locally and not throughout the entire length of the roller. When the latter condition takes place, the capacity of the bearing is materially reduced and the wear on the roller at its point of contact with the race ring is excessive, causing destruction of the roller and freezing of the bearings.

It is therefore an object of this invention to provide an anti-friction wheel and axle assembly wherein there is a perfect bearing between the anti-friction rollers and their race rings regardless of the condition of loading of the device.

Another object is to provide an anti-friction wheel and axle assembly whereby self-alignment is effected between the rollers of the bearing and the axles.

Another object is to provide a structure which prevents freezing of the bearings and wherein the load is equally distributed over said bearings under all conditions of operation.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a fragmentary sectional elevation of an anti-friction wheel and axle assembly embodying the invention; and Figure 2 is a fragmentary sectional elevation of a modified form of wheel and axle assembly embodying the invention.

Referring first of all more particularly to the structure illustrated in Figure 1, it will be seen that the outer axle or housing 10 is provided with an enlarged flaring portion 12 provided with an elongated wheel receiving portion 14 upon which the hub of the wheel 16 is mounted as by shrunk or press fit, shoulder 18 being provided on the flared end portion of the housing for positioning the wheel. An inner normally stationary axle 20 extends through the housing 10 and beyond the plane of the outer face of the wheel and into the journal box 22 where it is held against normal rotation, as described in copending application Serial No. 211,385, filed August 8, 1927, by Alfred H. Oelkers, for Tubular axle and roller bearing assembly, it being understood that wedges and journal bearings may be provided cooperating with the journal box and outer end of the axle, all as particularly described in copending application Serial No. 335,647, filed January 28, 1929, Patent No. 2,000,534, May 7, 1935.

The outer flared portion of the axle 10 is provided with a portion 24 for the reception of a bearing cup or outer race ring 26 rigidly mounted in the axle housing by a light press fit, the same being limitingly positioned by a shoulder 28 provided in the flared portion of the housing. A cover plate 30 may be secured as by bolts 32 to the outer flared portion of the housing and thence extends inwardly to the inner axle 20 in order to completely close the lubricant recess formed by the outer axle. The inner axle 20 is provided with a spherical surface 34 supporting the cone or inner race ring 36, which cone is placed snugly against said surface and maintained in its operative position by means of a retainer ring 38 shrunk or press fitted around the projecting end of the axle 20 to thereby form an adjustment for the operating cone.

The usual rollers 40, shown of the tapered type, are positioned between the inner and outer race rings and are shown as provided with cages 42. The retainer ring 38 is provided with a number of projecting lugs 44 engaging in notches 46 provided in the bearing cone to thereby prevent the bearing cone from revolving on the inner axle. The fit of the bearing cone however is not tight and therefore the axle 20 may bend or deflect the slight amount caused by loading the axle 20 without forcing the bearing cone out of its proper relation with respect to the rollers 40 and the bearing cup 26. In other words, when the axle deflects, slippage takes place between the convex spherical surface 34 of the axle 20 and the concave cooperating spherical surface on the cone 36, thereby permitting variable deflection of the axle 20 without a corresponding movement in the operating cone. It will thus be seen that the lateral tightness of the roller bearing in one end of the housing in combination with the bearing in the other end of the housing is governed by the endwise position of the bearing cup within the housing and the cover 30 is preferably provided with an inwardly projecting portion 48 which bears directly against the bearing cup 26 to thereby hold it in adjustment.

Referring now more particularly to the modification illustrated in Figure 2, the construction of the journal box 22, the outer axle or housing 10, and wheel 16 remains substantially the same. The inner axle 50 however is provided with the cylindrical portion 52 in place of the spherical portion 34. As before, the bearing cup 54 is mounted rigidly in the housing 10 and is positioned by the cover plate 56, shown as bolted at 58 to the flared end of the housing and the shoulder 60 provided in the lubricant recess formed by the housing. A spherical retainer or sleeve 62 is rigidly mounted on the inner axle 50 as by a press fit, and the slippage to permit deflection of the axle without depressing the bearing is in this case taken care of by the cooperating spherical surface on the bearing cone 64, rollers 66 maintained in cages 68 being provided to rotate between the bearing cone and cup. The cone retainer 62 is provided with a number of projecting lugs 70 which loosely fit in notches 72 provided in the bearing cone to thereby prevent rotation of the bearing cone on the cone retainer, and in this case the lateral adjustment of the tapered roller bearings of the axle assembly is obtained by moving the bearing cone retainer 62 endwise of the axle 50, and after proper adjustment is obtained, the cone is further secured by a locking ring 74 shrunk on the axle 50 and bearing directly against the sleeve 62.

It will thus be seen that with the two embodiments illustrated, relative deflection between the axles may take place without pinching the rollers or without forcing the load carrying rollers to transmit the load through the bearings at a point contact, and the rollers are of a self-aligning character to provide a maximum bearing between parts of the assembly.

It is to be understood that I do not wish to be limited by the exact embodiment of the device shown, which is merely by way of illustration and not limitation, as various other forms of the device will of course be apparent to those skilled in the art without departing from the spirit of the invention or the scope of the claims.

I claim:

1. In a wheel and axle assembly the combination of a wheeled rotary axle, a normally stationary axle extending through said rotary axle, anti-friction bearings disposed between said axles, said bearings including inner and outer race rings and rollers disposed therebetween, and a spherical portion disposed between one of said axles and one of said race rings to thereby permit relative movement between said axle and race ring.

2. In a wheel and axle assembly, the combination of a wheeled rotary axle, a normally non-rotatable axle extending through said rotary axle, anti-friction bearings disposed between said axles, said bearings including inner and outer race rings having rollers disposed therebetween, and means cooperating with said bearings and said non-rotatable axle whereby said bearings are self-aligning.

3. In a wheel and axle assembly, the combination of a wheeled rotary axle, a normally non-rotatable axle extending through said rotary axle, anti-friction bearings disposed between said axles, said bearings including inner and outer race rings having rollers disposed therebetween, and a spherical portion provided on the non-rotatable of said axles and cooperating with one of said race rings to thereby permit self-aligning of said bearings.

4. In a wheel and axle assembly, the combination of a wheeled rotary axle, a normally non-rotatable axle extending through said rotary axle, anti-friction bearings disposed between said axles, said bearings including inner and outer race rings having rollers disposed therebetween, and a member having a spherical portion provided on the non-rotatable of said axles and cooperating with one of said race rings whereby said bearings are self-aligned.

5. In a wheel and axle assembly, the combination of a wheeled rotary axle, a normally non-rotatable axle extending through said rotary axle, anti-friction bearings disposed between said axles, said bearings including inner and outer race rings having rollers disposed therebetween, and a spherical portion provided on said inner axle cooperating with a cooperating portion on said inner race ring whereby said bearings are self-aligned.

6. In a wheel and axle assembly, the combination of a wheeled rotary axle, a normally non-rotatable axle extending through said rotary axle, anti-friction bearings disposed between said axles, said bearings including inner and outer race rings having rollers disposed therebetween, and a member provided in said inner axle, said member having a spherical portion cooperating with a corresponding spherical portion on said inner race ring whereby said bearings are self-aligned.

7. In a wheel and axle assembly, the combination of a wheeled rotary axle, a normally stationary axle extending through said rotary axle, anti-friction bearings disposed between said axles, said bearings including an outer race ring fixedly secured to said outer axle and maintained in operative position by means provided on said outer axle, an inner race ring and rollers, said inner race ring being provided with an arcuate surface cooperating with a corresponding arcuate surface on said inner axle to thereby permit relative movement between said inner axle and said bearing.

8. In a wheel and axle assembly, the combination of a wheeled rotary axle, a normally stationary axle extending through said rotary axle, anti-friction bearings disposed between said axles, said bearings including an outer race ring fixedly secured to said outer axle and maintained in operative position by means provided on said outer axle, an inner race ring and rollers, said inner race ring being provided with an arcuate surface cooperating with a corresponding arcuate surface on said inner axle to thereby permit relative movement between said inner axle and said bearing, and a member provided on said inner axle and having cooperative engagement with said inner race ring to prevent relative movement of rotation of said race ring with respect to said inner axle.

9. In a wheel and axle assembly, the combination of a wheeled rotary axle, a normally stationary axle extending through said rotary axle, anti-friction bearings disposed between said axles, said bearings including inner and outer race rings and rollers disposed therebetween, and means disposed between the stationary of said axles and one of said race rings to thereby permit relative movement between said axle and race ring.

10. In a wheel and axle assembly, the combination of a wheeled rotary axle, a normally stationary axle extending through said rotary axle, anti-friction bearings disposed between said axles, said bearings including inner and outer race rings and rollers disposed therebetween, and means cooperating with the inner of said race rings whereby said race ring is permitted relative movement with respect to one of said axles.

11. In combination with a pair of relatively movable members, one of said members extending through the other, anti-friction bearings disposed therebetween and within one of said members, and means cooperating with said bearings whereby said bearings are permitted relative movement with respect to the inner of said members.

12. In a wheel and axle assembly, the combination of a wheeled rotary axle, a normally non-rotatable axle extending through said rotary axle, anti-friction bearings disposed between said axles, said bearings including inner and outer race rings having rollers disposed therebetween, and spherical means provided on said inner axle cooperating with a cooperating portion on said inner race ring whereby said bearings are self-aligned.

13. In a wheel and axle assembly the combination of a wheeled rotary axle, a normally stationary axle extending through said rotary axle, anti-friction bearings disposed between said axles, said bearings including inner and outer race rings and rollers disposed therebetween, one of said race rings being a two-part race ring having complementary spherical surfaces between the parts, said bearings permitting relative movement between said axles at said surfaces.

14. In a wheel and axle assembly the combination of a wheeled rotary axle, a normally stationary axle extending through said rotary axle, anti-friction bearings disposed between said axles, said bearings including inner and outer race rings and rollers disposed therebetween, the inner of said race rings being a two-part race ring having complementary spherical surfaces between the parts, said bearings permitting relative movement between said axles at said surfaces.

15. In a wheel and axle assembly, the combination of an inner normally stationary axle, a wheel, anti-friction means between said wheel and axle, said anti-friction means including inner and outer race rings, one of said race rings being a two-part race ring having complementary spherical surfaces between the parts, said bearings permitting relative movement between said wheel and axle.

16. In a wheel and axle assembly, the combination of an inner normally stationary axle, a wheel, anti-friction means between said wheel and axle, said anti-friction means including inner and outer race rings, the inner of said race rings being a two-part race ring having complementary spherical surfaces between the parts, said bearings permitting relative movement between said wheel and axle.

17. In combination with a rotatable member and a substantially non-rotatable member, an anti-friction bearing therebetween, said anti-friction bearing including roller members and race rings, the race ring cooperating with said non-rotatable member being in two parts permitting relative movement therebetween.

18. In a roller bearing assembly, the combination of race rings, rollers disposed therebetween, the inner of said race rings being in a plurality of parts having curved cooperating surfaces.

19. In a roller bearing assembly, the combination of race rings, rollers disposed therebetween, the inner of said race rings being in a plurality of parts, the surfaces between said parts being spherically complementary.

20. In a roller bearing assembly, the combination of race rings, rollers disposed therebetween, the inner of said race rings being in a plurality of parts, the surfaces between said parts being complementary, and one of said surfaces being arcuate.

21. In a roller bearing assembly, the combination of race rings, rollers disposed therebetween, the inner of said race rings being in a plurality of parts, the surfaces between said parts being complementary, and one of said surfaces being spherical.

ALFRED H. OELKERS.

CERTIFICATE OF CORRECTION.

Patent No. 2,030,151.  February 11, 1936.

ALFRED H. OELKERS.

It is hereby certified that error appears in the printed specification of the above numbered patent requiring correction as follows: Page 2, first column, line 70, claim 1, for "one" read the stationary; and that the said Letters Patent should be read with this correction therein that the same may conform to the record of the case in the Patent Office.

Signed and sealed this 31st day of March, A. D. 1936.

Leslie Frazer
Acting Commissioner of Patents.

(Seal)